(12) United States Patent
Wang

(10) Patent No.: US 9,477,034 B2
(45) Date of Patent: Oct. 25, 2016

(54) TWINKLING SUSPENDER

(71) Applicant: Hua-Cheng Pan, Tainan (TW)

(72) Inventor: Chih-Liang Wang, Tainan (TW)

(73) Assignee: Hua-Cheng Pan, Tainan (TW)

( * ) Notice: Subject to any disclaimer, the term of this patent is extended or adjusted under 35 U.S.C. 154(b) by 63 days.

(21) Appl. No.: 14/462,587

(22) Filed: Aug. 19, 2014

(65) Prior Publication Data

US 2016/0054513 A1     Feb. 25, 2016

(51) Int. Cl.
*F21V 8/00* (2006.01)

(52) U.S. Cl.
CPC ............. *G02B 6/0076* (2013.01); *G02B 6/006* (2013.01); *G02B 6/0083* (2013.01)

(58) Field of Classification Search
CPC ............... F21W 2121/00; H01K 7/06; A47G 2033/0827
USPC ......................................... 362/396, 605, 806
See application file for complete search history.

(56) References Cited

U.S. PATENT DOCUMENTS

| 2005/0011737 A1* | 1/2005 | Wong ..................... A43B 3/001 200/61 |
| 2008/0089075 A1* | 4/2008 | Hsu ........................ A47G 33/08 362/363 |

* cited by examiner

*Primary Examiner* — Karabi Guharay
*Assistant Examiner* — Meghan Ulanday
(74) *Attorney, Agent, or Firm* — Leong C. Lei

(57) ABSTRACT

A twinkling suspender mainly includes a main body, main seat and light guiding unit. The main seat is configured on one side of the main body, and has an accepting space and a through hole in communication with the accepting space. The accepting space is configured with at least two light-emitting elements adapted to illuminate toward the through hole and controlled by a control circuit to wink in sequence. The light guiding unit has two light guiding plates pervious to light stacked together, fixed to one side of the main seat and sealing up the through hole. One side of each light guiding plate has staggered decorative patterns and a light incidence face corresponding to the light-emitting element. Whereby, light beams can be scattered into the light guiding plate to form an effect of staggered twinkling of decorative patterns.

9 Claims, 9 Drawing Sheets

TWINKLING SUSPENDER

TECHNICAL FIELD OF THE INVENTION

The present invention relates to a suspender, and more particularly to a suspender having a twinkling effect.

DESCRIPTION OF THE PRIOR ART

Accompanying the improvement of life style and economic environment, people have a variety of demands for the decoration of life space. People diversify their living space by hanging various models of hanging decorations. To add special festival atmosphere, a variety of small decorative objects in response to festivals have appeared in the consumer market.

Although the following takes a stocking hook having Christmas atmosphere as an example to explain, but the present invention is not so limited. Main bodies of stocking hook decorations usually seen in the consumer market includes a variety of modeling designs in response to Christmas atmosphere, such as Christmas tree, Santa Claus, snowman, and etc, where a hook portion is configured on each of them so as to provide a function for hanging a gift stocking. However, the designs of the most decoration main bodies are only stressed on the change of appearance or material without attraction and interest to visual sense organs.

SUMMARY OF THE INVENTION

The main object of the present invention is to provide a newly designed suspender, having a twinkling effect, allowing the suspender to be more eye-catching.

To achieve the object mentioned above, the present invention proposes a twinkling suspender, mainly including:

a main body;

a main seat, configured on one side of the main body and capable of being fixed on a planar surface, an inner side of the main seat defining an accepting space, the main seat being configured with a through hole in communication with the accepting space, the accepting space being configured with a control circuit in electric connection with a battery for a provision of electric power, at least two light-emitting elements spaced apart being configured correspondingly to the through hole and illuminating toward an outer edge of the through hole, each light-emitting element being in electric connection with the control circuit and controlled by the control circuit to wink in sequence; and a light guiding unit, having a first light guiding plate and second light guiding plate each being a plate pervious to light with a thickness, fixed on one side of the main seat to seal the through hole, the first light guiding plate and second light guiding plate each having a front wall face and rear wall face spaced apart and side wall faces between the first front wall face and rear wall face in connection therewith, the front wall faces each having a decorative pattern forming a staggered configuration, the side wall face being formed with a light incidence face corresponding to the light-emitting element, and the rear wall face of the first light guiding plate being attached to the front wall face of the second light guiding plate.

When the light-emitting elements are turned on, light beams can be scattered into the first light guiding plate and second light guiding plate through the light incidence face, and the two light-emitting elements wink in sequence, allowing the decorative patterns of the first and second light guiding plates to be more eye-catching, and form a staggered twinkling effect.

DETAILED DESCRIPTION OF THE PREFERRED EMBODIMENTS

Figure 1:
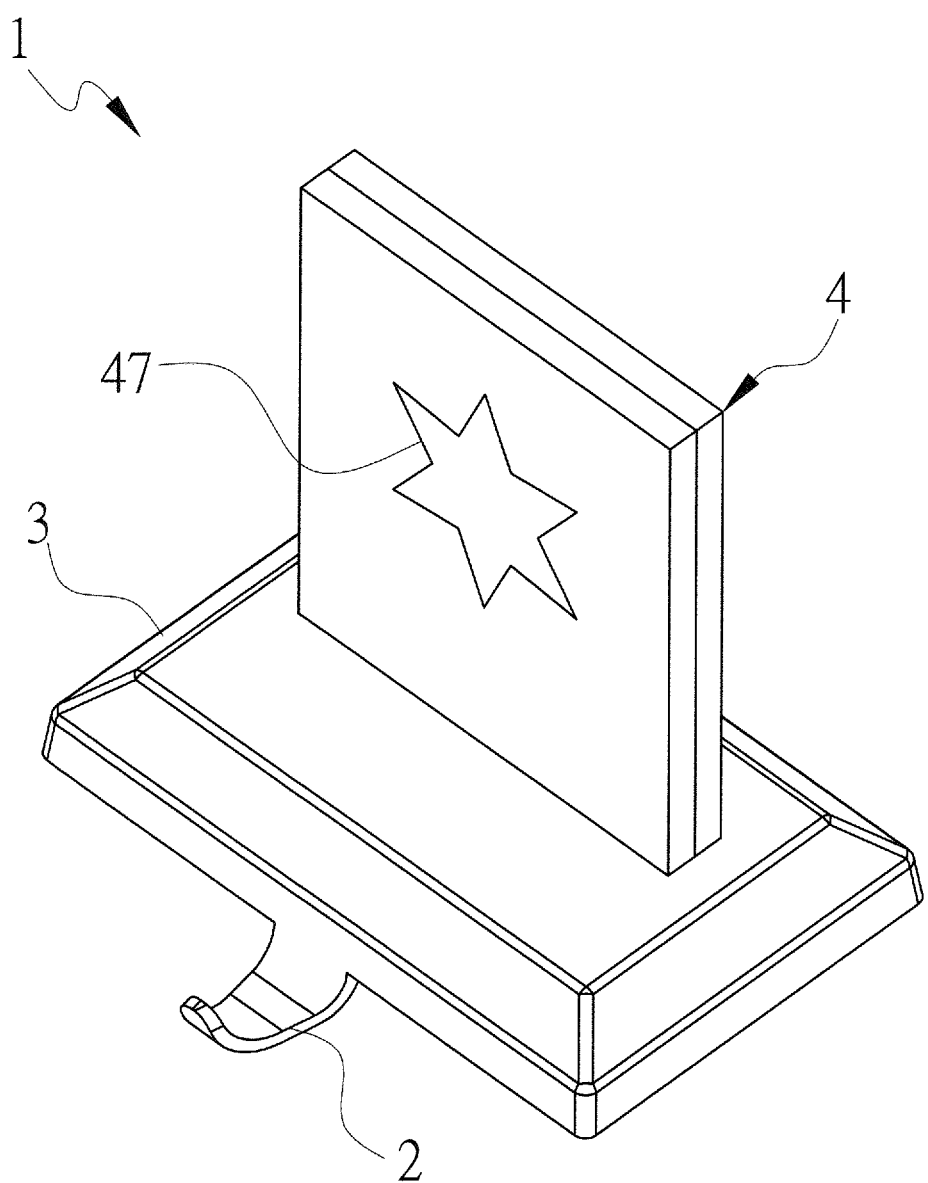
FIG. 1 is a schematically perspective view of the present invention.
Figure 2:
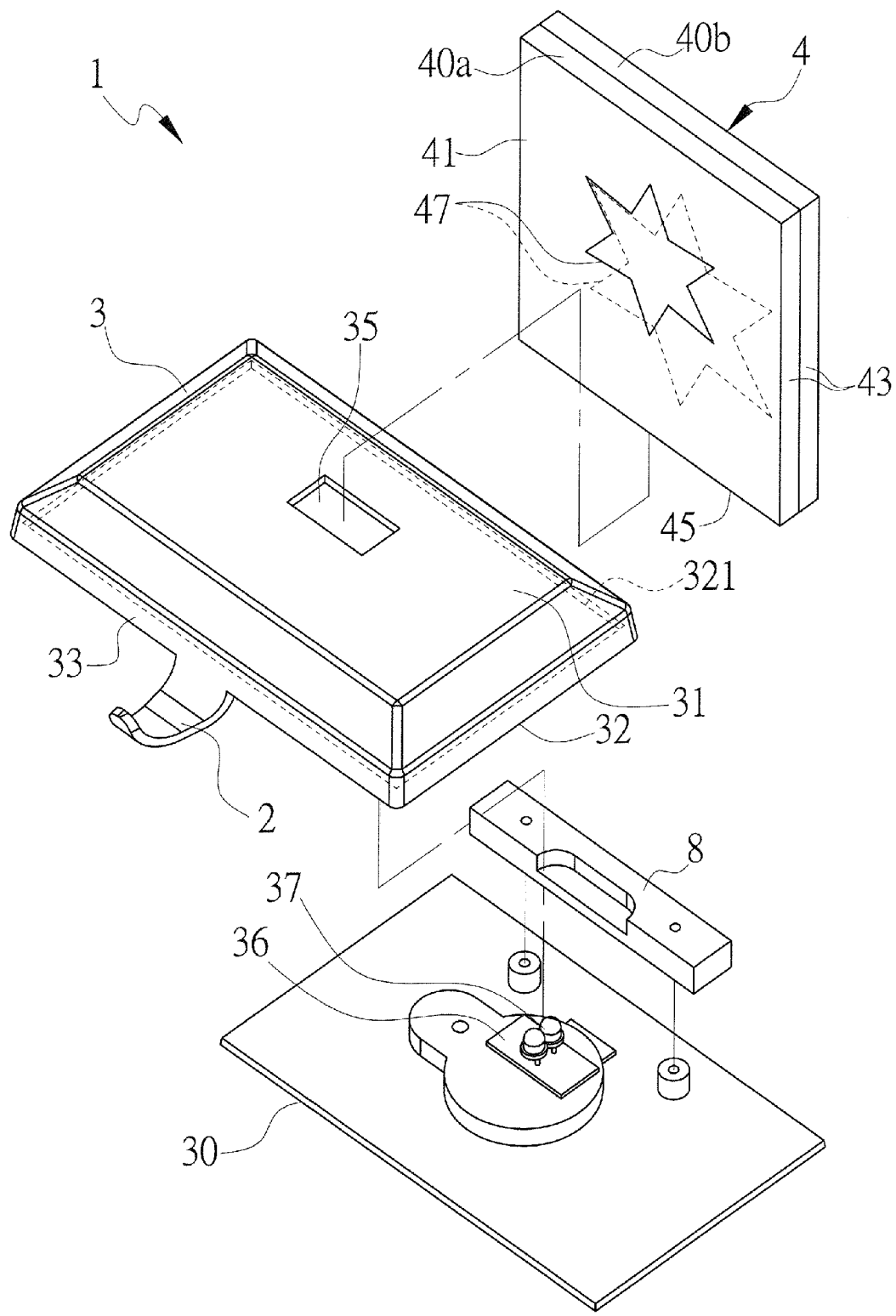
FIG. 2 is an exploded view of the present invention.
Figure 3:
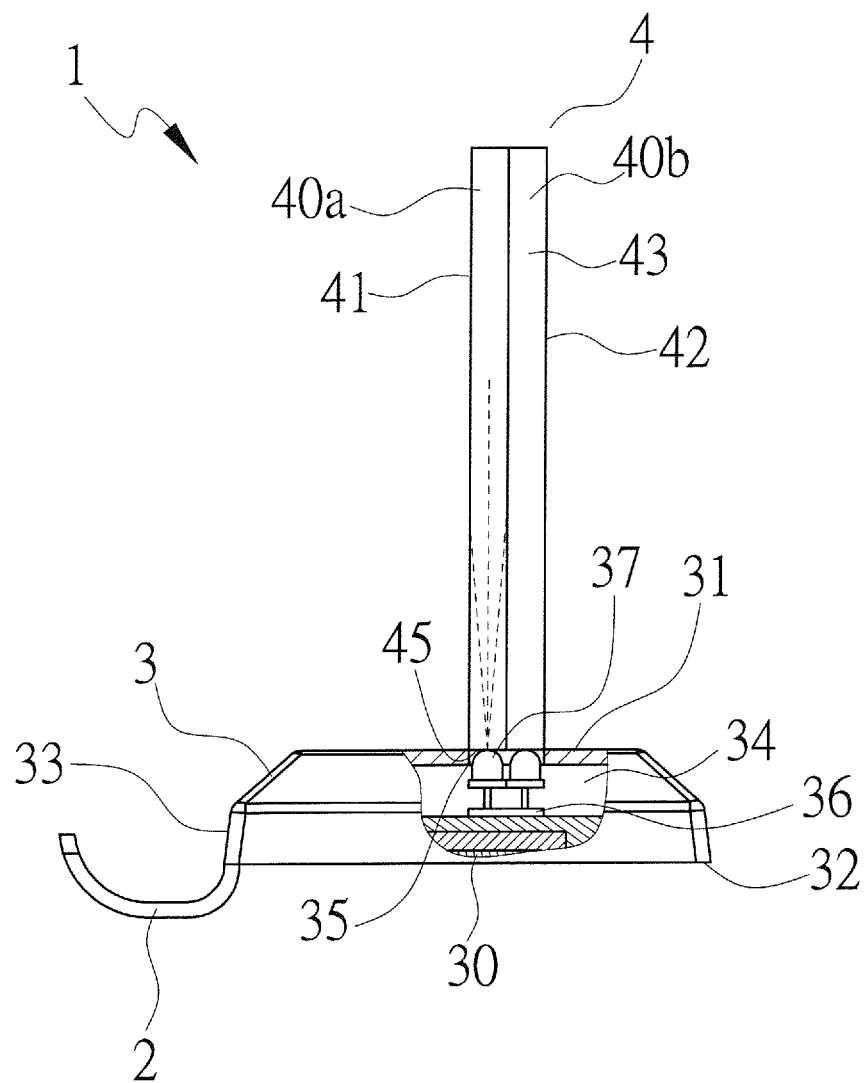
FIG. 3 is a side view of the present invention.

Referring to FIGS. 1 to 3, a twinkling suspender 1 of the present invention is a decoration used in matching with environmental space, especially, used on a planar plane, providing a hanging function. The suspender 1 mainly includes a main body 2, main seat 3 and a light guiding unit 4. The main seat 3 is configured on one side of the main body 2, and the light guiding unit 4 is fixed to one side of the main seat 3, where the main body 2 may assume a hook type or rod type; it can have a variety of forms, and all forms of main bodies that can be used for hanging fall in the scope of the present invention. Hereinafter, a J-shaped hook-typed main body is taken as an example to describe.

The main seat 3 has a first end face 31 and second end face 32, and side faces 33 between the first end face 31 and second end face 32 adapted to be in connection with the peripheral edges thereof; the first end face 31, second end face 32 and side faces 33 define an accepting space surrounded thereby. Furthermore, a through hole 35 in communication with the accepting space 34 is configured on the first end face 31, and the main seat 3 is coupled to one side of the main body 2 through the side face 33 by means of screwing, adhesion, integral extension, or etc. In the present embodiment, the main body 2 is extended out integrally from the side face of the main seat 3, and the second end face 32 of the main seat 3 is formed with an opening 321 in communication with the accepting space 34, the opening 321 being sealed with a bottom cover 30. In the present embodiment, the second end face 32 of the main seat 3 is a smooth surface, adapted to place on a flat surface such as wall face or table face, and the main body 2 provides a hanging function.

Furthermore, the accepting space 34 is configured with a control circuit 36 in electric connection with a battery for the provision of electric power, and at least two light-emitting elements 37 spaced apart are configured in the accepting space correspondingly to the through hole 35, illuminating toward the outer edge of the through hole 35. In the present embodiment, each light-emitting element 37 is an LED, which is in electric connection with the control circuit 36 and controlled by the control circuit 36 to wink sequentially; the number of the light-emitting elements 37 is not limited, increased depending on requirements.

The light guiding unit 4 has a first light guiding plate 40a and second light guiding plate 40b each of which is a plate pervious to light having a thickness, fixed to the first end face 31 of the main seat 3 and sealing the through hole 35. In addition, the first light guiding plate 40a and second light guiding plate 40b each has a front wall face 41, rear wall face 42 and side wall faces 43 between the front wall face 41 and rear wall face 42 in connection with the peripheral edges thereof, where each front wall face 41 has a decorative pattern 47, and the decorative patterns 47 of the first light guiding plate 40a and second light guiding plate 40b are staggered. In the present embodiment, the decorative pattern 47 is stars; the side wall face 43 forms a light incidence face 45 corresponding to at least one light-emitting element 37. When the suspender 1 of the present invention is turned on, light beams of each light-emitting element 37 will be incident on the light incidence faces 45 of the first light guiding plate 40a and second light guiding plate 40b, allowing the light beams to spread inside the whole light guiding unit 4 uniformly, and the decorative patterns 47 twinkle with the light beams of the corresponding light-emitting elements 37, thereby having a decoration profiting effect of staggered twinkling.

Figure 4:
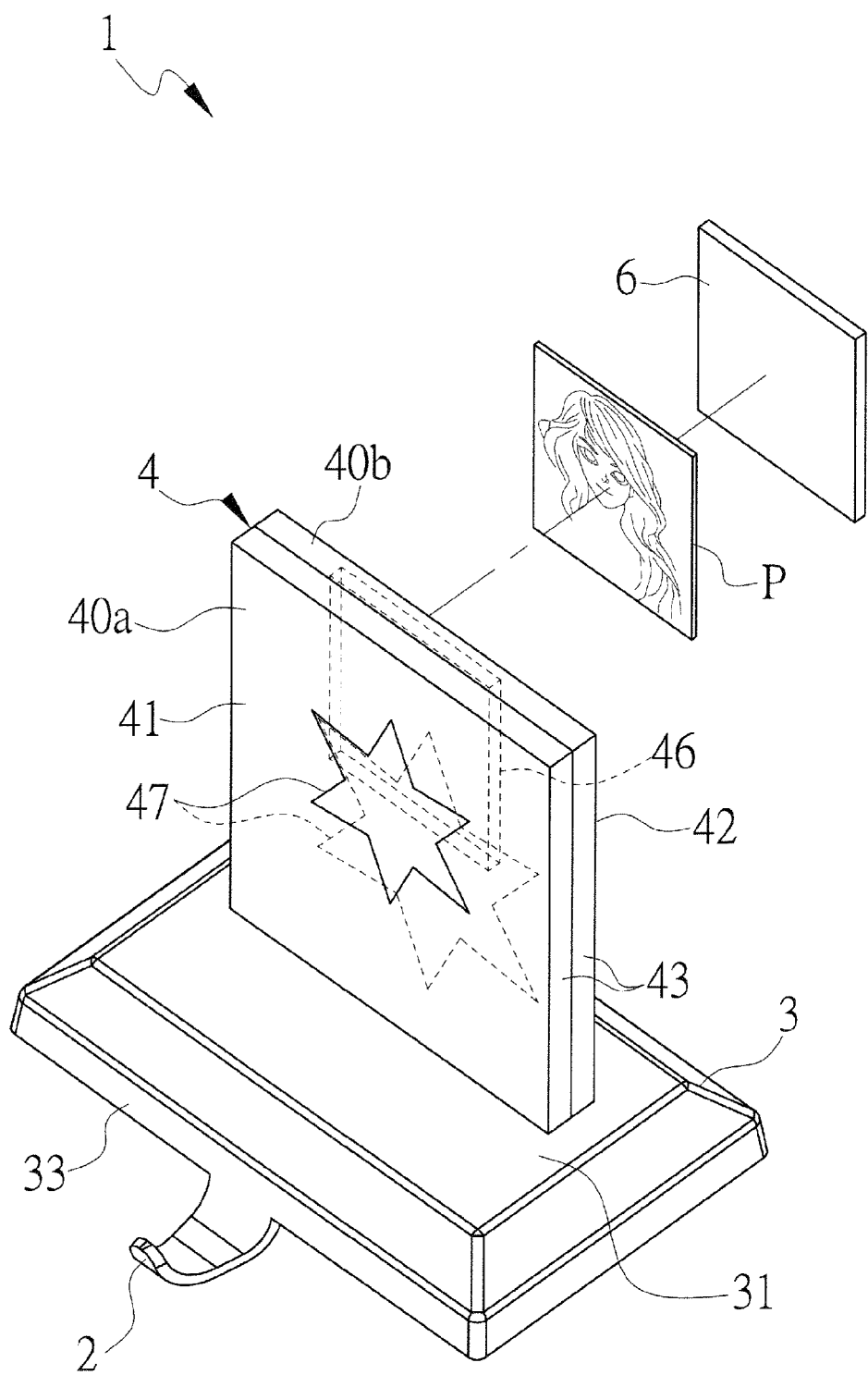
FIG. 4 is a schematically perspective view of a preferred embodiment of a twinkling suspender with a photo frame function according to the present invention.

Furthermore, referring to FIG. 4, which shows a preferred embodiment of a twinkling suspender with a photo frame according to the present invention, a groove 46 may be configured on the rear wall face 42 of the second light guiding plate 40b, where a press plate 6, the peripheral edge of which is in a tight fit with the groove 46, is configured in the groove 46, where a paper sheet such as photo P or decorative paper may be placed between the bottom of the groove 46 and the press plate 6, whereby endowing the suspender with a photo frame function so as to allow it to have an added value.

Figure 6:
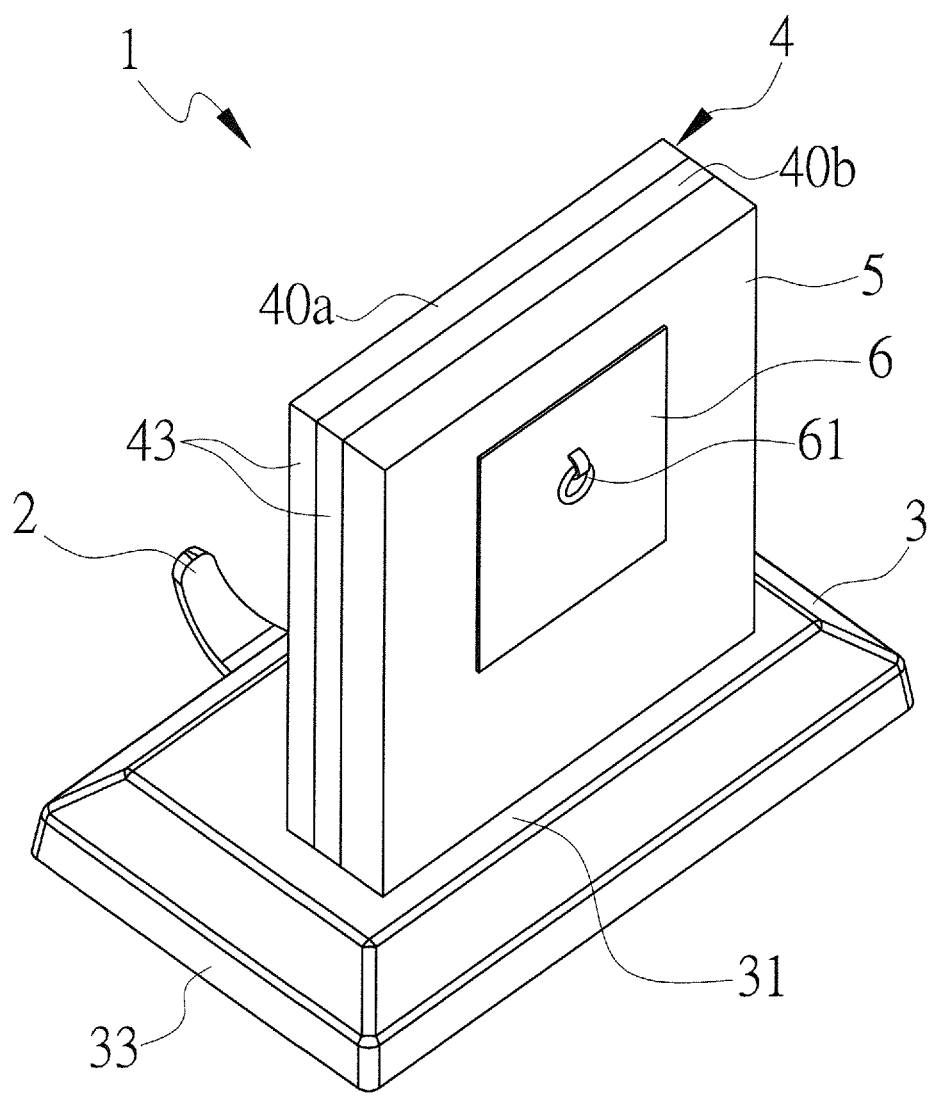
FIG. 6 is a schematically perspective view of the embodiment of the twinkling suspender with a photo frame function according to the present invention after assembly.
Figure 7:
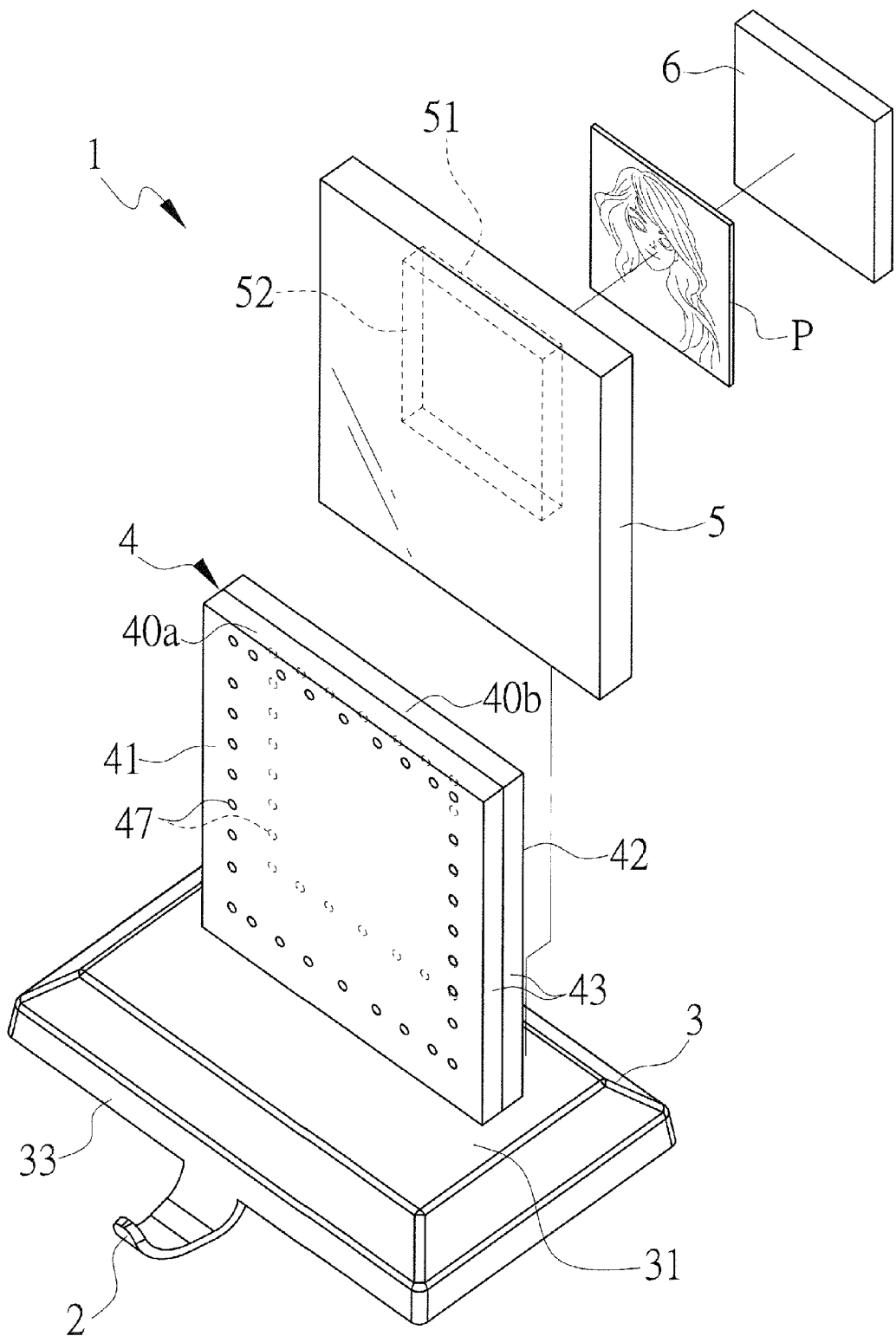
FIG. 7 is an exploded view of the embodiment of the twinkling suspender with a photo frame function according to the present invention.
Figure 8:
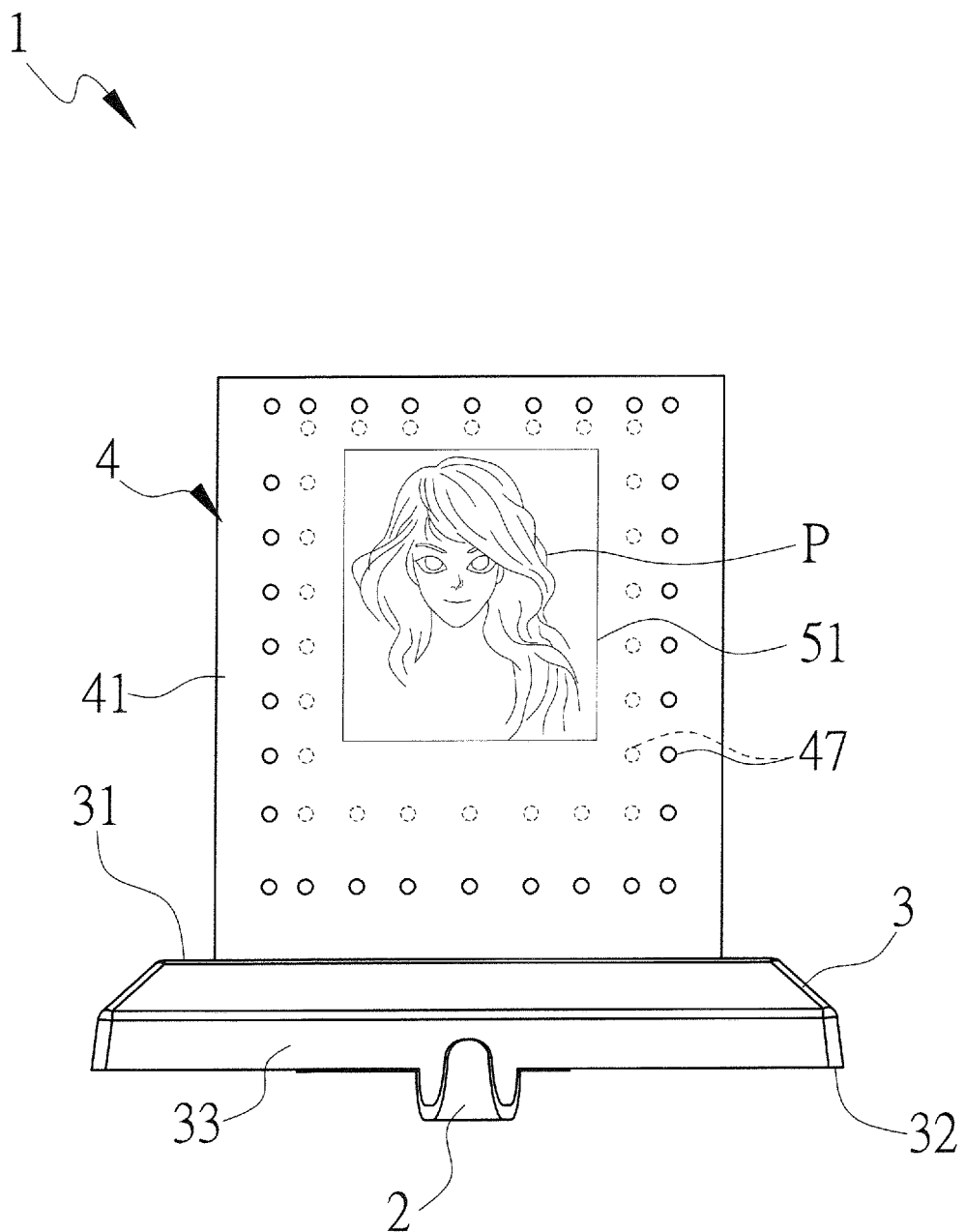
FIG. 8 is a front view of the embodiment of the twinkling suspender with a photo frame function according to the present invention.

Next, referring to FIGS. 6 to 8, which respectively are a schematically perspective view, exploded view and front view of another preferred embodiment of a twinkling suspender having a photo frame function according to the present invention, the twinkling suspender 1 further includes a back plate and a press plate 6, where the back plate 4 is transparent and attached to the rear wall face 42 of the second light guiding plate 40b, a groove 51 being configured on one side of the back plate 4 in opposition to the second light guiding plate 40b. Moreover, the press plate 6 is configured on one side of the back plate 5 and adapted to seal up the groove 51. In addition, the peripheral edge of the press plate 6 is in tight fit with the peripheral edge of the groove 51 so that a grip portion 61 allowing the press plate 6 to have a point of application is configured on the outer side of the press plate 6, thereby placing the press plate 6 out of or into the groove 51 of the back plate 5 easily. In the present embodiment, each decorative pattern 47 is a geometrical pattern configured around the photo P, but the present invention is not so limited.

Figure 9:
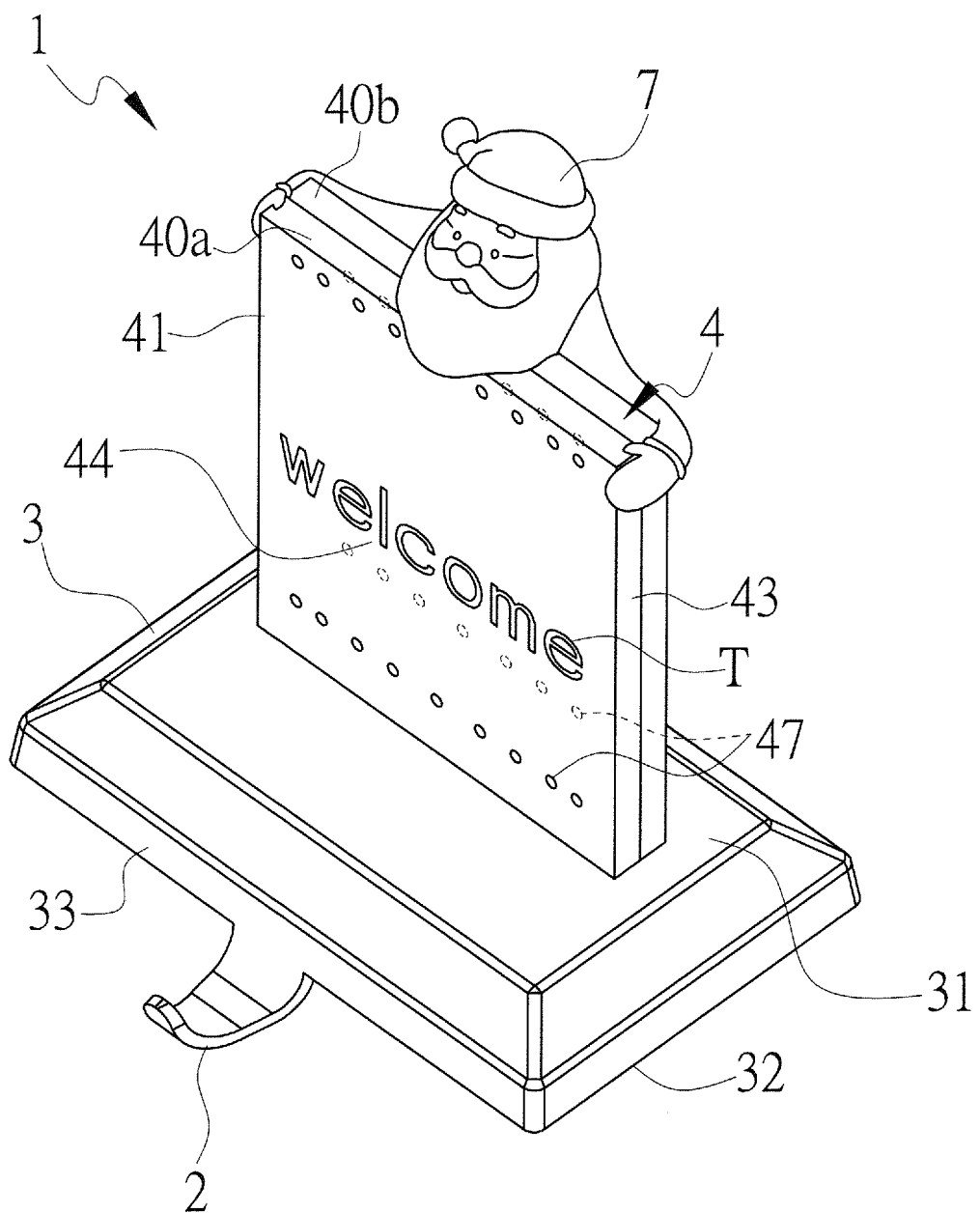
FIG. 9 is perspective view of the present invention in a use state.

Here, a paper sheet such as a photo P or decorative paper may be placed between the bottom face 52 of the groove 51 and the press plate 6, thereby endowing the suspender 1 with a photo frame function, and the placed-in photo P can be brighter through the distribution of the light beams in the light guiding unit 4 configured in front of the back plate 5. Referring to FIG. 9, the present invention further includes a decorative member 7 fixed to one side of the second light guiding plate 40b or the back plate 5, where the decorative member 7 is an occasional three-dimensional modeling object, thereby increasing the interest of the present invention. The decorative member 7 may be for example, such as an occasional object in relation to Christmas. In the present embodiment, the decorative member 7 is Santa Claus modeling object, but the present invention is not so limited.

Furthermore, referring to FIG. 2 again, a counterweight block 8 is configured in the accepting space 34 of the main seat 3. When the suspender of the present invention is placed on a plane to use as a stocking hook, the center of gravity of the entire suspender is allowed to be maintained at the main seat 3, being unlikely to cause the center of gravity to be unstable due to objects hung thereby.

Figure 5:
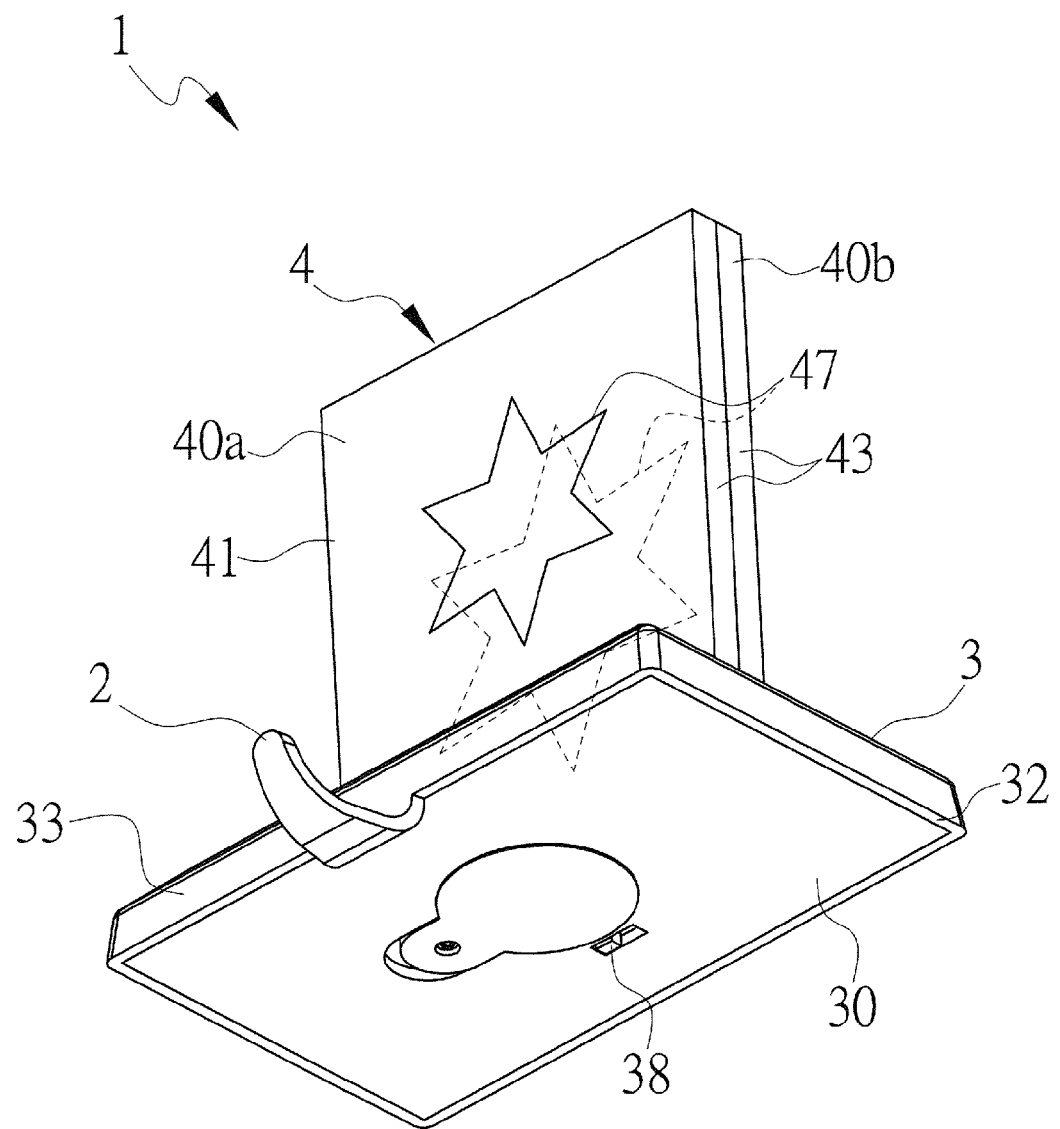
FIG. 5 is a bottom perspective view of the present invention.

Referring to FIG. 5 again, the present invention further includes a switch 38 in electric connection with the control circuit 36; the switch 38 may be a general manual switch or shaking switch, mainly adapted to switch on or off power source; if the switch 38 is a shaking switch, the power source is then conducted only if the suspender of the present invention is moved slightly, allowing the light-emitting element 37 to start brightening automatically. The shaking switch is a conventional electronic appliance, the detail thereof is here omitted.

Referring to FIG. 9 again, a writing area 44 adapted for writing or painting is configured on the front wall face 41 of the first light guiding plate 40a, where the writing or painting is carried out by a varied of colors of fluorescent markers or a fluorescent marker adapted for writing or painting on a LED writing board which has a better effect. Upon use, a fluorescent marker is used to write word T or paint patterns on the writing area 44, and when the suspender is turned on, the light beams emitted from each light-emitting element 37 will be incident on the light incidence face 45 of the first light guiding plate 40a, allowing the beams to be distributed inside the light guiding plate 40a to make the words T or patterns on the writing area 44 to be more eye-catching through the illumination of the beams.

To sum up, the present invention has the following advantages:
1. the present invention has a decoration profiting effect of the twinkling of the staggered decorative patterns.
2. the words or patterns on the writing area may be revised anytime to increase variability.
3. the illumination and twinkling of beams from the light-emitting elements can make the suspender of the present invention to be more eye-catching while being used in a dim environment.

I claim:
1. A twinkling suspender, comprising:
a main body;
a main seat, configured on one side of said main body, capable of being fixed to a planar surface, an inside of said main seat defining an accepting space, a through hole in communication with said accepting space being configured thereon, a control circuit in electric connection with a battery being configured in said accepting space for provision of electric power, at least two light-emitting elements corresponding to said through hole being spaced apart and illuminating toward an outer edge of said through hole, each said light-emitting element being in electric connection with said control circuit and controlled by said control circuit to wink in sequence; and
a light guiding unit, having a first light guiding plate and second light guiding plate, said first light guiding plate and second light guiding plate each being a plate pervious to light having a thickness and fixed to one side of said main seat to seal said through hole, said first light guiding plate and second light guiding plate each having a front wall face, rear wall face spaced apart and side wall faces between said front wall face and rear wall face in connection therewith, said front wall faces each having a decorative pattern forming a staggered configuration, said side wall face forming a light incidence face corresponding to said light-emitting elements, and said rear wall face of said first light guiding plate being attached to said front wall face of said second light guiding plate;

wherein a groove is configured on said rear wall face of said second light guiding plate, and a press plat is configured in said groove.

2. The twinkling suspender according to claim 1, further comprising a back plate and press plate, said back plate being transparent and attached to said rear wall face of said second light guiding plate, one side thereof in opposition to said light guiding plate being configured with a groove, said press plate being configured on one side of said back plate and sealing up said groove.

3. The twinkling suspender according to claim 2, wherein a grip portion is configured on an outer side of said press plate.

4. The twinkling suspender according to claim 1, further comprising a decorative member fixed to one side of said light guiding unit.

5. The twinkling suspender according to claim 1, wherein a counterweight block is configured in said accepting space of said main seat.

6. The twinkling suspender according to claim 1, wherein said main body is extended out from said main seat.

7. The twinkling suspender according to claim 1, further comprising a switch conducting electricity from a power source.

8. The twinkling suspender according to claim 7, wherein said switch is a shaking switch.

9. The twinkling suspender according to claim 1, wherein a writing area is configured on said front wall face of said first light guiding plate.

* * * * *